Nov. 8, 1927.  
J. W. EASTER  
1,648,762  
WHEEL  
Filed Nov. 26, 1926

INVENTOR  
John W. Easter  
John A. Naismith  
ATTORNEY

Patented Nov. 8, 1927.

1,648,762

UNITED STATES PATENT OFFICE.

JOHN W. EASTER, OF SAN JOSE, CALIFORNIA.

WHEEL.

Application filed November 26, 1926. Serial No. 150,899.

The present invention relates particularly to vehicle wheels.

It is one object of the present invention to provide an efficient means for absorbing the shocks and vibrations ordinarily transmitted through the wheel structure between the hub and rim by means of pneumatic cushioning devices inserted therein, thereby cooperating with the wheel tire and body suspension devices for preventing the said shocks and vibrations from reaching the body of the vehicle.

It is also an object of the invention to provide a means of the character indicated that will be simple in construction, economical to manufacture, easily maintained in operative condition, and highly efficient in its practical application.

In the drawing:—

Figure 1:
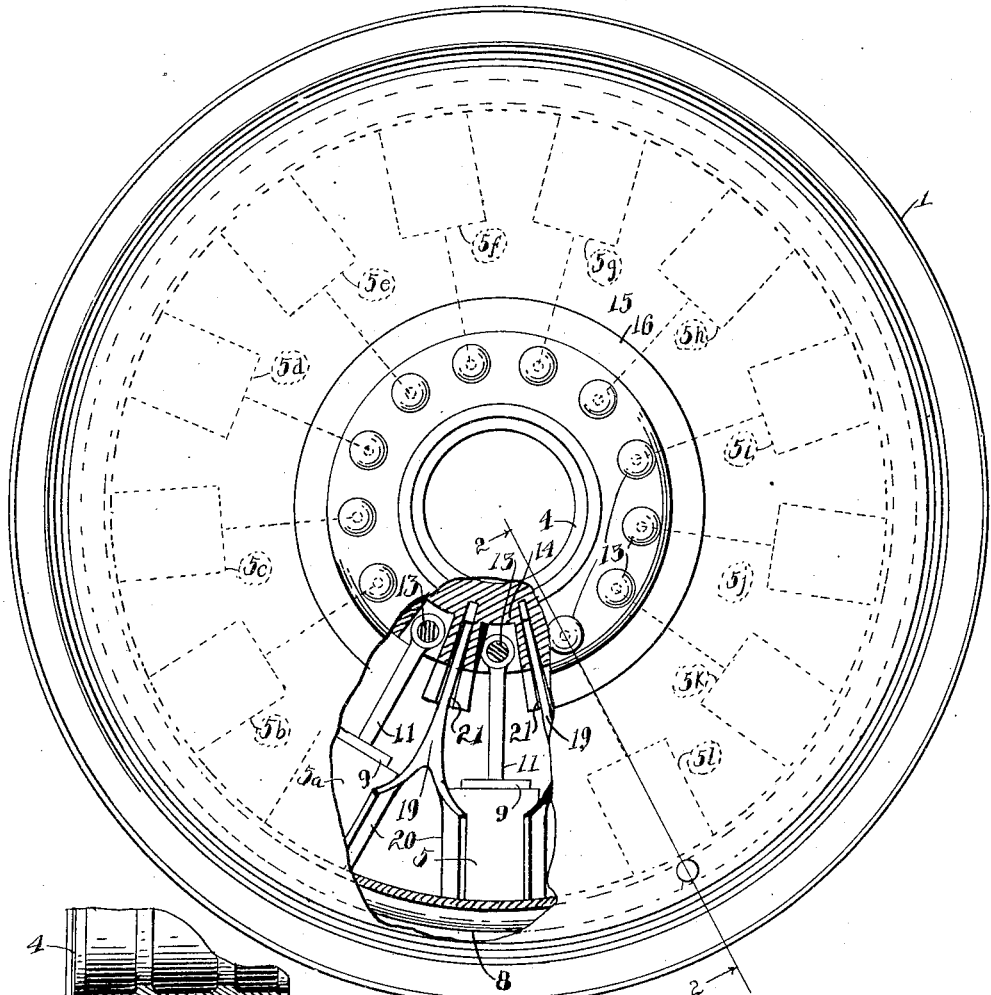
Figure 1 is a side elevation of a wheel embodying my invention part being broken away.

Referring now more particularly to the drawing, I show at 1 a wheel rim with the felly at 2 and tire at 3. A portion of the hub is indicated at 4.

In carrying out my invention, I provide a number of small cylinders such as indicated at 5, and mount these cylinders on the inner periphery of the wheel felly as shown with their inner open ends directed inwardly. I prefer to use an odd number of these cylinders for reasons hereinafter set forth. In the present case I have shown thirteen cylinders designated by the reference characters 5, $5^a$, $5^b$, $5^c$, $5^d$, $5^e$, $5^f$, $5^g$, $5^h$, $5^i$, $5^j$, $5^k$, and 51 respectively. Each of these cylinders has a check valve as shown at 6 mounted therein to control the flow of air through a conduit 7 communicating therewith and with a supply conduit 8 mounted on the wheel as shown. This conduit 8 is provided with a valve at $8^a$ through which the several cylinders may be supplied with air.

In each of the cylinders is mounted a piston as indicated at 9, the said piston being fitted with a wrist-pin 10 and a piston rod 11. The piston rod 11 is pivotally connected at 12 to a bolt 13 passing through a boss 14 formed on the hub portion 4.

Figure 2:
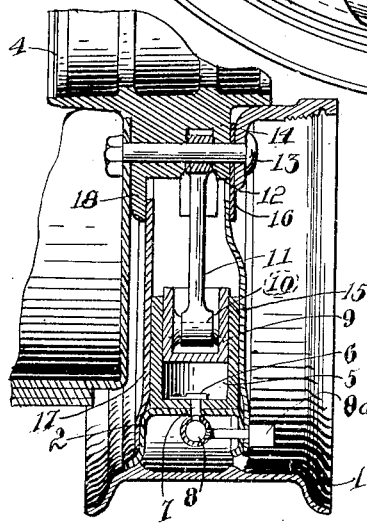
Figure 2 is a sectional view on line 2—2 of Figure 1.

The several parts described are protected by plates as 15 and 16 mounted on the felly and hub respectively and overlapping as clearly shown in Figure 2, and by an inner plate 17 mounted on the felly and overlapping a flange 18 on the hub portion 4.

When the parts are all assembled as above set forth, air pumped into the conduit 8 will pass into the several cylinders through the check valves 6 so they will all be filled with air under the same pressure.

It may now be readily seen that when the cylinders are once charged as described they provide independent cushions between the wheel hub and the outer structure, so that a movement of the hub upwardly or downwardly is met with resisting air cushion both above and below. The pivoting of the piston rod permits a slight relative movement of the hub and cylinder, but this movement is slight because of the cushions distributed about the wheel and in radial relation to the same.

In order to relieve the piston-cylinder construction of the strains incident to sudden starting and stopping, I have provided a bar 19 between each two cylinders and mounted thereon in any suitable manner as at 20. These bars are radially arranged with the inner end engaging a socket as 21 in the part 14. The parts 19 and 21 are so proportioned that some movement is permitted therebetween, and the socket is of such a depth that if for any reason the air cushions are not functioning the hub structure will ride upon the radial bars 19. By means of this or some similar construction inserted between the inner and outer portions of the wheel the sudden application of power to the wheel to rotate the same will not subject the piston-cylinder devices to undue stresses and strains.

It is desirable to provide an odd number of these devices so that no failure of the valve system will permit merely the transfer of air from the lower to the upper cylinders.

It is to be understood, of course, that while I have herein shown and described but one specific embodiment of the invention, changes in form, construction and method of assembly and operation may be made within the scope of the appended claims.

I claim:

1. In combination, a wheel rim and hub, a plurality of radially arranged cylinders and pistons operatively inserted between the rim and hub and operated by relative movements thereof, check valve controlled means for introducing air into the several cylinders, and telescoping means inserted between the rim and hub intermediate the radially arranged pistons and cylinders for limiting the rotative movement of the rim relative to the hub.

2. The combination with the hub and felly of a wheel, of an air conduit mounted upon the felly in concentric relation thereto, a plurality of air cushion chambers radially mounted upon the felly within said air conduit and having check valve controlled communication therewith, a piston operatively mounted in each chamber, a piston rod pivotally monuted on each piston and on the wheel hub.

3. The combination with the hub and felly of a wheel, of an air conduit mounted upon the felly in concentric relation thereto, a plurality of air cushion chambers radially mounted upon the felly within said air conduit and having check valve controlled communication therewith, a piston operatively mounted in each chamber, a piston rod pivotally mounted on each piston and on the wheel hub, and overlapping and relatively movable plates carried by the hub and felly to form an enclosed chamber for said pistons and chambers.

JOHN W. EASTER.